UNITED STATES PATENT OFFICE 2,430,170

PRODUCTION OF ALCOHOL AND GLYCEROL BY FERMENTATION

Cyril Ernest Grover, Cheam, England, assignor to The Distillers Company Limited, Edinburgh, Scotland, a company of Great Britain No Drawing. Application January 21, 1944, Serial No. 519,201. In Great Britain December 22, 1942

10 Claims. (Cl. 195—38)

Many attempts have been made to produce glycerol from sugar by fermentation of sugar solutions with yeast. These methods have consisted in the addition of alkalies or alkali metal sulphites before or during fermentation and in nearly all cases the fermentation has been conducted so as to increase, to the maximum extent possible, the small proportion of glycerol (about 3% by weight calculated on the sugar employed) normally obtained in the fermentation of sugar to industrial ethyl alcohol. This has necessitated the use of considerable quantities of soluble or insoluble alkalies or sulphites and has led to numerous difficulties both in the fermentation itself and in the recovery of the alcohol and glycerol. Speaking generally, an increase in production of glycerol results in a diminution of the amount of alcohol produced and previous workers have almost entirely concentrated on producing the maximum quantity of glycerol and have ignored the question of the yield of alcohol. Yields of glycerol as high as 30% or over (based on sugar employed) have been described for the sulphite process and up to 20% for the alkali process have been reported.

Such processes, (particularly when carried out on an industrial scale) possess a number of disadvantages, which include the following:

1. The addition of considerable quantities of alkalies or alkali sulphites requires very skilled control and considerably increases the time of fermentation, which may take as long as 100 to 150 hrs. and may, even after that time, be incomplete.

2. The risk of infection of the mash by bacteria leading to loss of glycerol by conversion to trimethylene glycol is considerably increased at the high pH and by the prolonged time of fermentation necessary when substantial quantities of alkalies are used as referred to in the preceding passage.

3. The use of alkali sulphites leads to the production of acetaldehyde which complicates the distillation of the alcohol, while the alcohol obtained is of an inferior grade, and further purification is necessary.

4. The use of alkali sulphites leads to difficulties of corrosion in the plant.

5. The use of large quantities of sodium carbonate is mechanically unsatisfactory as sodium carbonate is not readily soluble in the mash and tends to settle at the bottom of the fermenter without dissolving.

6. The recovery of glycerol is complicated by the use of substantial quantities of alkalies or alkali sulphites since the ratio of impurities to glycerol in the fermented mash, after removal of alcohol and yeast, becomes unduly high.

7. The evaporation of spent washes containing large quantities of alkalies or alkali sulphites is technically very difficult owing to priming and frothing during heating.

8. Recovery of carbon dioxide is economically impossible when sulphites are employed.

In normal alcohol fermentations, the proportion of glycerol obtained is so small, and the ratio of impurities to glycerol is so high as to render the recovery of glycerol almost impossible, economically, without complicated extraction and purification process.

I have now devised a process for fermenting sugar solutions to obtain a greater quantity of glycerol than is obtained by the normal industrial alcohol fermentations, which can be carried out in a distillery without seriously affecting the normal routine distillery procedure, and at the same time reduces the ratio of impurities to glycerol so as to render the recovery of the glycerol an economical and relatively simple procedure.

Accordingly my invention comprises, in the manufacture of ethyl alcohol and glycerol by the fermentation by yeast of a solution containing sugar and buffering substances, the steps of seeding the said sugar-containing solution with yeast, allowing the fermentation to proceed initially at a pH which is less than 7, adding sodium hydroxide, in an amount of between 0.5% and 4% by weight of the sugar depending upon the buffering power of the solution, during the period lying between 5 and 30 hours from the time of seeding the solution and thereafter allowing the fermentation to continue. Sodium carbonate, potassium hydroxide, potassium carbonate, ammonia or mixtures of these substances (in quantities equivalent to the sodium hydroxide) may be used in place of the whole or a part of the sodium hydroxide. Preferably the alkali is not added until substantially the whole yeast crop has grown. A suitable initial concentration of sugar in the seeded mash is 100 to 250, preferably 170 to 200, pounds per 100 gallons.

Such a process possesses a number of advantages when compared with those processes previously described. The initial fermentation period, which is carried out before the addition of alkali, proceeds at a low pH value, i. e. is acidic and allows the yeast to develop strongly with the minimum risk of infection; the risk of infection is always present when fermentation commences in the presence of alkali. The whole fermentation may be completed in about 50 to 70 hours, depending on the amount of the alkali and on the nature of the sugar used; this time is of the same order as or only slightly greater than the time required in normal distillery practice and it is considerably shorter than that required when larger quantities of alkalies or sulphites are employed. The percentage yield of glycerol, based on the weight of sugar (calculated as total invert sugar) employed, is increased from about 3.0% for a normal alcohol fermentation to as much as 6-9%, while the total yield of alcohol plus glycerol may be increased by as much as 2.5% (of the normal total yield). Also, the increased production of glycerol per unit of alkali employed, is unexpectedly high within the limits of alkali addition I have laid down. Thus with 2.2% by weight of sodium hydroxide (based on the total weight of sugar) it is possible to increase the yield of glycerol from 3% up to 9%, i. e. an increase of 6% on total sugars. On the other hand, according to known processes, it is necessary to employ up to or more than 30% by weight of alkali in order to obtain an increase of 17% by weight of the glycerol based on total sugars.

The higher concentration of glycerol in the spent wash (that is, the fermented mash from which ethyl alcohol has been removed) and the consequent lower ratio of impurities to glycerol, renders the recovery of the glycerol more economic than in the case of normal distillery spent wash and the difficulties, experienced when larger amounts of alkalies or alkali metal sulphites are employed, are avoided.

The sugar employed in the process may be any fermentable sugar or sugar-containing material which may be employed in the production of industrial alcohol, such, for example, as molasses. I prefer to employ high test molasses, that is, a sugar syrup containing about 65-80% by weight of sugars. This type of molasses contains considerably less impurities than blackstrap molasses and consequently the recovery of glycerol is simplified. Various types and batches of molasses differ considerably in their buffering power, and although with molasses having a moderate to high buffering power the higher amounts of alkali within the limits I have laid down may be employed, I prefer in the case of sugar solutions of low buffering power, to employ amounts of alkali nearer the lower limit.

The nutrients usually employed in normal alcohol fermentations, i. e. ammonium sulphate and diammonium phosphate, may also be employed in the process according to my invention, but these, according to a feature of the invention, can be partly or wholly replaced by ammonium chloride as by this means reduction of the scaling experienced in evaporation of the spent wash for glycerol recovery can be achieved.

According to a further feature of the invention the wort is, before addition of yeast, sterilised, partially sterilised or pasteurised: the latter is, I find, preferable.

As the source of alkali we prefer to use sodium hydroxide in aqueous solution, e. g. in 50% strength by weight: the risk of excessive frothing of the mash experienced when adding alkali carbonates is thereby avoided. However, if desired, the addition of alkali may be made partly as sodium hydroxide solution and partly as a strong solution of sodium carbonate. In this case the sodium hydroxide is preferably added before the sodium carbonate for the reason mentioned above. I have found it inadvisable to employ sodium carbonate in the solid form as solution may be incomplete, while the use of substantially insoluble basic oxides such as lime and magnesia, would necessitate the use of stirring equipment.

The addition of alkali may be made at any time during the period between 5 hours and 30 hours after the seeding of the mash with yeast. It may be added continuously, intermittently or as a single addition during this period. I prefer (especially when using sodium hydroxide and/or sodium carbonate) to add the whole of the alkali during a period of about 15 minutes at approximately 10 to 12 hours after the seeding of the mash. The addition may be made later with a slight lowering of the final yield of glycerol.

When, however, using ammonia as the source of alkali, especially in conjunction with a sugar solution of low buffering power, the addition of alkali may be made in two or more parts spread over a longer period than 15 minutes, as otherwise, with amounts near the upper limit I have stated for the amount of alkali according to my invention, the fermentation time may become unduly protracted.

The yeast used in the fermentation may be acclimatised to slightly alkaline fermentation if desired, but I prefer to carry out the fermentation without such acclimatisation. Care should be taken to maintain the seed yeast cultures free from infection. In order to disturb distillery practice as little as possible, the initial sugar solutions may, if desired, be somewhat higher in concentration than those normally used, so that the decrease in spirit yield due to glycerol production, is offset, and the final spirit concentration may be thus maintained at (or even increased above) the normal level. This higher spirit concentration is more readily tolerated by the yeast at the more favourable pH obtaining during the later stages of the fermentation carried out according to the process of the present invention than in the normal way.

Careful temperature control is advisable during fermentation. During the initial stages, i. e. before addition of alkali, the temperature is preferably maintained within those limits normally used in distillery practice, i. e. about 88° to 96° F. Immediately prior to the addition of alkali, however, it is advisable for the temperature to be not higher than 94° F. After addition of alkali the temperature generally rises to 97-98° F., and it is not advisable to allow the temperature to exceed this limit. Care should be taken to ensure intimate mixing of the alkali with the fermenting mash and this may be achieved by gentle aeration for a few minutes. Carbon dioxide evolution is suppressed for a short time (up to two hours, depending on the quantity of alkali employed) after the addition of alkali. After addition of alkali the fermentation is preferably allowed to proceed to completion before distillation of the alcohol.

It is not necessary to use water in making up the sugar-containing mash before fermentation. It is possible to employ at least part of the spent wash from a previous fermentation i. e. fermented mash from which alcohol has been removed by distillation, in diluting the molasses or sugar to the required concentration. The spent wash may still contain glycerol in solution and it is even advisable not to remove the glycerol when re-using the spent wash as we have found that the fermentation of the sugar is not adversely affected by the use of spent wash in this way. In fact, considerable advantages may be obtained by the use of spent wash as the concentration of glycerol in the final wash is increased roughly in proportion to the amount of spent wash from a previous fermentation used to make the initial mash. A considerable economy is thereby effected in evaporation costs in the glycerol recovery. Thus, in the case of 100% slop-back the concentration of glycerol in the spent wash is approximately doubled, and the amount of water to be removed by evaporation for recovery of a given quantity of glycerol is consequently halved. This slopping-back process may, if desired, be repeated, partially or completely, for two or more successive fermentations. Thus 50% by volume of the spent wash from one fermentation may be carried forward and used in making up the mash for a second fermentation, and 50% by volume of the spent wash from this fermentation may be used for a third fermentation and so on.

It is highly advisable that the plant for recovering alcohol and glycerol is so designed that the fermented mash may pass to the separators, and the clarified wash to the stills, as soon as possible after completion of fermentation. If the spent wash from the stills has to be stored, it should either be kept hot, or other precautions taken to avoid development of infection. This is particularly important when the spent wash is to be used for "slopping-back." Although development of some types of infection may not be harmful, it is advisable to maintain the spent wash in a sterile condition in order to avoid the development of trimethyleneglycol-forming bacteria.

Yeast is preferably removed from the fermented mash before distillation of the alcohol in order to facilitate recovery of glycerol. This may be carried out by means of a centrifuge or other convenient means.

Recovery of the glycerol from the spent wash may be carried out by any convenient means. The spent wash is preferably concentrated, for this purpose, to a point at which the water content is between about 20% and 70% by weight. Glycerol may be extracted from this concentrated wash in the known manner by means of an organic solvent, with or without a preliminary treatment with lime, or by distillation in the presence of a hydrocarbon oil. A further method of recovery is that described in British Application No. 7567/40. If sugar solutions having a low content of impurities are employed in the fermentation, it may be possible to recover the glycerol directly by distillation of the concentrate.

The following examples illustrate the manner in which the invention may be carried into effect:

*Example 1*

A 4128 gallon mash was made up from high test molasses containing 7813 lbs. of sugar (reckoned as total invert sugar), 40 lbs. of ammonium sulphate and 4 lbs. of diammonium phosphate. The molasses, in 50% by weight aqueous solution, together with nutrients had been pasteurised for 30 minutes at 180–190° F. and then made up to volume with water, and the temperature adjusted to 90° F. 279 gallons of a seed yeast culture was then added at this temperature and fermentation was allowed to proceed for 3 to 4 hours with gentle aeration. Aeration was then stopped and the temperature was allowed to rise to a maximum of 96° F. during the first 12 hours of fermentation, during which time the pH had dropped from an initial value of 5.2 to approximately 3.5. At the end of 12 hours, the mash temperature was lowered to 93° F. and sodium hydroxide solution was run in during a period of about 15 minutes. The amount of alkali introduced was 180 lbs. of sodium hydroxide: this is equivalent to 2.23% by weight of the overall sugar employed, or more conveniently, 4.06 pounds per 100 gallons of the final mash volume. The mash was agitated by gentle aeration for a few minutes after the addition of the sodium hydroxide. Fermentation was then allowed to proceed at a temperature of 95–96° F. and was complete in about 56 hours as shown by the fact that the gravity of the mash remained constant after this time. The final pH value of the fermented mash was 6.2. The alcohol concentration of the fermented mash was equivalent to 16.32% proof, and the glycerol concentration 14.8 lbs. per 100 gallons. These figures correspond to a yield based on total sugar introduced into the fermenter, of 40.6% by weight of alcohol and 8.12% by weight of glycerol, making a total of 48.72%. The total sugar used including that in the seed yeast culture added (overall sugar) was 8081 lbs. The final mash volume of 4435 gallons corresponds to an overall sugar concentration of 182.2 lbs. per 100 gallons. The fermented mash, after separation of yeast, had a non-glycerol dry matter to glycerol ratio of 1.73:1. Sugar consumption was 95.2%.

*Example 2*

A similar experiment was conducted using the same proportion of sodium hydroxide and the same stock of molasses as that in Example 1 with 63% "slop-back" from a previous fermentation. (Since fermented mash becomes diluted with condensed steam during the distillation of the alcohol the spent wash contains a lower concentration of glycerol than the fermented mash from which it was obtained. The expression used therefore means that of a total mash volume of say X gallons, an amount of spent wash was employed containing the same quantity of glycerol as was contained in 0.63 X gallons of fermented mash from the previous fermentation.) The fermentation time was 52 hours, the initial and final pH values being 5.3 and 6.0 respectively. The overall sugar concentration (including the sugar introduced with the seed yeast) was 181.9 lbs. per 100 gallons. The alcohol concentration of the fermented mash was 16.67% proof, and the glycerol content 25.9 lbs. per 100 gallons (made up of 9.6 lbs. carried forward from the previous fermentation and 16.3 lbs. made during the fermentation described above.) This corresponds to a yield based on total sugar employed, of 40.7% by weight of alcohol, 8.96% by weight of glycerol making a total of 49.7%. The fermented mash after separation of yeast had a non-glycerol dry matter to glycerol ratio of 1.65:1, and a concentrate was prepared from this wash, after distillation of alcohol, having a glycerol content of 24.9% by weight. These figures indicate the further improvement in yield of glycerol and total products when "slopping-back" is employed according to the described method of fermentation.

*Example 3*

A further experiment, carried out with a different stock of high test molasses, on the 50,000 gallon scale (without "slop-back") with an overall sugar concentration of 184 lbs. per 100 gallons gave an alcohol concentration corresponding to 16.02% proof, and a glycerol concentration of 15.5 lbs. per 100 gallons representing a yield based on total sugar of 39.5% by weight of alcohol, 8.42% by weight of glycerol, representing a total of 47.92%. In this experiment 2000 lbs. of sodium hydroxide were added as a 50% by weight solution after 12 hours. The pH values during the fermentation were as follows: initial pH 5.0: before addition of alkali 3.8: after addition of alkali 7.25 and final pH 5.2. The percentage of sugar consumed was 94.0% by weight and the ratio of non-glycerol dry matter to gylcerol was 2.1:1. By comparison, a normal large scale industrial alcohol fermentation on the same stock of high test molasses carried out at an overall sugar concentration of 14.45 lbs. per 100 gallons gave a wash containing 14.00% proof spirit and 4.6 lbs. glycerol per 100 gallons representing yields of 44.01% by weight of alcohol and 3.18% by weight of glycerol based on total sugar.

*Example 4*

Comparative experiments on the 4 litre scale, without "slop-back," were carried out on the same batch of high test molasses, to demonstrate the effect of varying the amount of alkali (sodium hydroxide) added. The alkali was added at 15 hours after commencement of fermentation in all cases.

|  | A | B | C | D |
|---|---|---|---|---|
| Alkali added (pounds per 100 gallons of mash) | 0 | 2 | 3 | 4 |
| Alkali added (per cent by weight of sugar) |  | 1.09 | 1.63 | 2.18 |
| Sugar in wash (as Total Invert Sugar lbs. per 100 gallons) | 161.1 | 184.1 | 184.1 | 184.1 |
| Alcohol (percent Proof) | 15.86 | 17.00 | 16.90 | 16.67 |
| Glycerol in wash (lbs. per 100 gallons) | 4.1 | 11.2 | 11.6 | 13.8 |
| Percentage yields (by weight) on Total Sugar: |  |  |  |  |
| Alcohol | 44.75 | 41.94 | 41.73 | 41.07 |
| Glycerol | 2.54 | 6.08 | 6.30 | 7.50 |
| Alcohol and Glycerol | 47.29 | 48.02 | 48.03 | 48.57 |
| Percentage by weight of Total Sugars fermented | 96.3 | 96.4 | 96.4 | 96.3 |
| pH: |  |  |  |  |
| Initial | 5.2 | 5.2 | 5.2 | 5.2 |
| After fermentation for 15 hrs | 3.6 | 3.6 | 3.6 | 3.6 |
| After addition of alkali |  | 6.2 | 7.4 | 8.8 |
| Final | 3.5 | 5.3 | 6.0 | 6.6 |

*Example 5*

A series of experiments were carried out on a 4 litre scale to show the effect of variation of the time of the addition of alkali. High test molasses mashes were used in each case, the volume of seed-stage inoculum being equivalent to 6% by volume on final stage. In each case 4.0 pounds of sodium hydroxide per 100 gallons of mash or 2.22% by weight on overall sugar concentration (179.4 lbs. per 100 gallons) was added.

| Time of alkali addition (Hrs. after seeding) | 10 | 12 ¼ | 16 | 20 |
|---|---|---|---|---|
| Alcohol in wash (per cent Proof) | 15.91 | 15.99 | 16.12 | 16.08 |
| Glycerol in wash (pounds per 100 gallons) | 14.1 | 14.0 | 13.2 | 12.6 |
| Percentage yields (by weight) on Total Sugar: |  |  |  |  |
| Alcohol | 40.27 | 40.46 | 40.78 | 40.67 |
| Glycerol | 7.86 | 7.80 | 7.36 | 7.02 |
| Alcohol and Glycerol | 48.13 | 48.26 | 48.14 | 47.67 |

*Example 6*

A further series of (laboratory) experiments (on the 4 litre scale) was made to show the effect of partly or wholly replacing sodium hydroxide by sodium carbonate. The addition of alkali was made 16 hours after seeding. High test molasses mashes were used in all cases with an overall sugar concentration of 180 lbs. per 100 gallons. The alkali added was equivalent to 2.22% by weight of sodium hydroxide based on sugar.

| Alkali addition (pounds per 100 gallons mash) | 4.0NaOH | 2.0NaOH 2.6Na₂CO₃ | 5.3Na₂CO₃ |
|---|---|---|---|
| Alcohol in wash (per cent Proof) | 16.37 | 16.43 | 16.47 |
| Glycerol (pounds per 100 gallons of wash) | 14.2 | 14.0 | 13.5 |
| Percentage yields (by weight) on Total Sugar: |  |  |  |
| Alcohol | 41.26 | 41.42 | 41.54 |
| Glycerol | 7.89 | 7.78 | 7.50 |
| Alcohol and Glycerol | 49.15 | 49.20 | 49.04 |

*Example 7*

A further series of laboratory experiments (on the 4 litre scale) were conducted comparing equivalent amounts of sodium hydroxide, potassium hydroxide and ammonia, the amount added in each case being equivalent to 2.16% by weight sodium hydroxide based on sugar. Overall sugar concentration was 185.3 lbs. per 100 gallons.

| Alkali addition (pounds per 100 gallons mash) | 4.0NaOH | 1.7NH₃* | 1.7NH₃† | 5.6KOH |
|---|---|---|---|---|
| Alcohol in wash (per cent Proof) | 16.42 | 16.18 | 16.28 | 16.42 |
| Glycerol (pounds per 100 gallons of wash) | 14.2 | 14.2 | 13.3 | 14.3 |
| Percentage yields (by weight) on Total Sugars: |  |  |  |  |
| Alcohol | 40.2 | 39.7 | 39.8 | 40.2 |
| Glycerol | 7.7 | 7.6 | 7.2 | 7.8 |
| Alcohol and Glycerol | 47.9 | 47.3 | 47.0 | 48.0 |
| pH: |  |  |  |  |
| After alkali addition | 9.2 | 8.4 | 7.6 | 9.2 |
| Final | 6.4 | 6.4 | 6.4 | 6.4 |

*Alkali added as 1.5 ammonia after 15 hours and 0.2 after 16½ hours from the time of seeding.
†Alkali added as 1.3 ammonia after 15 hours and 0.4 after 16 hours from the time of seeding.

No trimethylene glycol was detected in the products of fermentation in any of the above examples.

All of the above described experiments, carried out according to the process of our invention were made using a race of the yeast *Saccharomyces cerevisiae* which had previously been found to give good yields of glycerol from molasses when the fermentation was conducted in the presence of high concentrations of alkali metal carbonates. This race of yeast has been found to give slightly higher yields of glycerol in a normal industrial alcohol fermentation than do most other yeast races. My process is, however, applicable to various races of yeast, such, for example, as those employed in the production of industrial alcohol. The yield of glycerol obtained in normal alcohol fermentation has been found to vary somewhat according to the race of yeast employed. Generally speaking, those races giving higher yields of glycerol under normal fermentation conditions respond more favorably to the process according to our invention.

Normally, the fermentation is carried out without aeration because aeration renders the recovery of evolved carbon dioxide very difficult, if not impossible, whilst at the same time a part of the alcohol is driven off and needs to be recovered. On the other hand there may be some advantage in a gentle aeration because the carbon dioxide is thereby removed from the mash leading to an increase in the pH of the mash and making it possible to economise by the possibility of reducing the amount of alkali which needs to be added.

What I claim is:

1. In the manufacture of ethyl alcohol and glycerol by the fermentation by yeast of a solution containing a sugar and buffering substances the steps comprising seeding said sugar-containing solution with yeast, allowing the fermentation to proceed initially at a pH which is less than 7, adding a strong alkali selected from the class consisting of the hydroxides and carbonates of the alkali metals and ammonia during the period lying between 5 and 30 hours from the time of seeding the solution in an amount chemically equivalent to a weight of sodium hydroxide of not less than one half percent and not greater than four percent by weight of the sugar in said solution and thereafter allowing the fermentation to continue.

2. A process according to claim 1 wherein spent wash from a previous fermentation is used in the making-up of the sugar-containing solution said spent wash having been maintained in a sterile condition.

3. A process according to claim 1 wherein the sugar-containing solution is pasteurized prior to the step of seeding with yeast.

4. A process according to claim 1 wherein the amount of alkaline substance is dependent on the buffering power of said solution, an amount of alkaline substance nearer the upper limit being employed in the case of the more highly buffered sugar solutions and an amount of alkaline substance nearer the lower limit being employed in the case of the less highly buffered sugar solutions.

5. A process according to claim 1 wherein the concentration of sugar at the time of seeding said solution is from 170 to 200 pounds per 100 imperial gallons.

6. A process according to claim 1 wherein the concentration of sugar at the time of seeding said solution is from 100 to 250 pounds per 100 imperial gallons.

7. A process according to claim 1 wherein the yeast is *Saccharomyces cerevisiae* acclimatized to produce glycerol in the presence of alkali metal carbonates.

8. A process according to claim 1 wherein ammonia is employed as said alkaline substance and is added to a sugar-containing solution of low buffering power in at least two portions with an interval between additions of at least 15 minutes.

9. A process according to claim 1 wherein the addition of the alkaline substance is effected over a period of about 15 minutes.

10. A process according to claim 1 wherein the alkali is not added until the yeast growth is substantially completed.

CYRIL ERNEST GROVER.

REFERENCES CITED

The following references are of record in the file of this patent:

UNITED STATES PATENTS

| Number | Name | Date |
| --- | --- | --- |
| 1,551,997 | McDermott | Sept. 1, 1925 |
| 1,990,908 | Krug | Feb. 12, 1935 |
| 1,678,150 | Lawrie | July 24, 1928 |
| 2,169,245 | Hildebrandt | Aug. 15, 1939 |
| 2,153,704 | Werner | Apr. 11, 1939 |
| 1,474,750 | Willkie | Nov. 20, 1923 |
| 1,725,363 | McDermott | Aug. 20, 1939 |
| 2,275,639 | Mnookin | Mar. 10, 1942 |